July 4, 1967

H. E. LINDBERG 3,329,120

CHAIN PIPE COVER

Filed Feb. 28, 1966

INVENTOR
HOWARD E. LINDBERG
BY
*Sandoe, Naill, Schottler & Wikstrom*
ATTORNEYS.

July 4, 1967
H. E. LINDBERG
3,329,120
CHAIN PIPE COVER
Filed Feb. 28, 1966
2 Sheets-Sheet 2
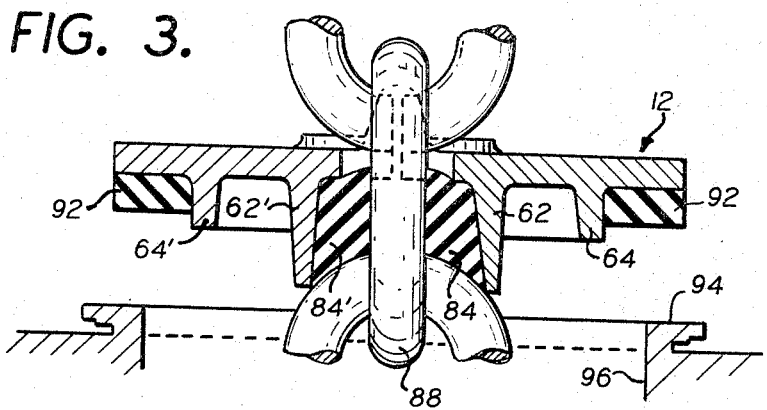
FIG. 3.
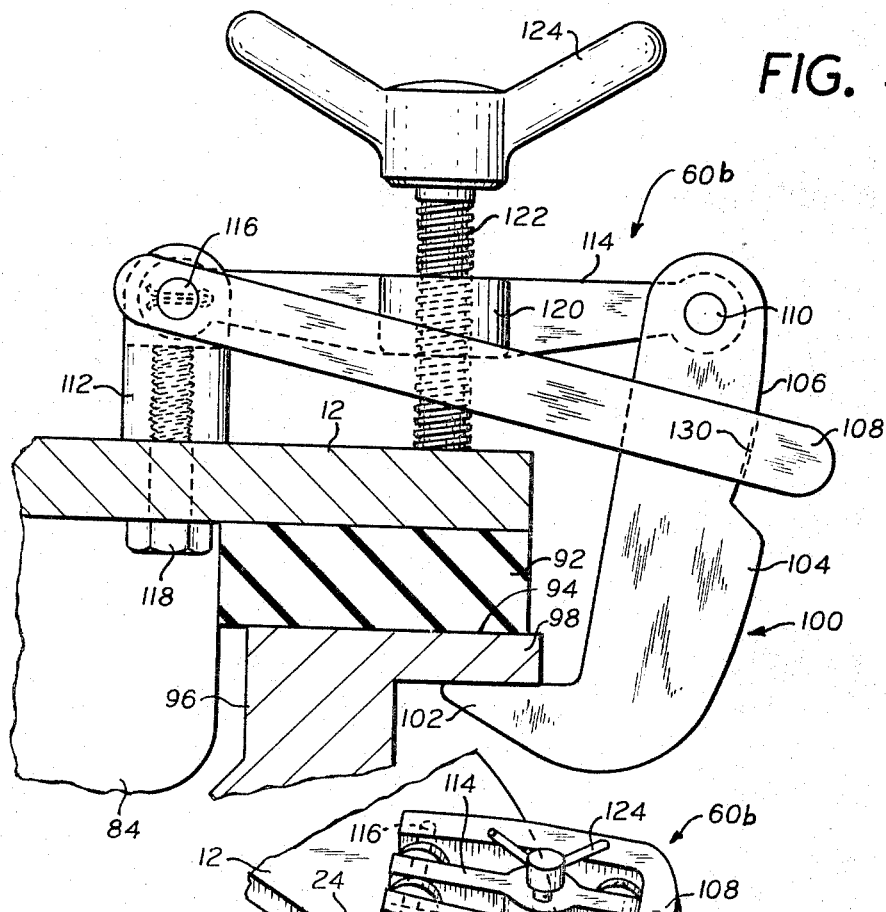
FIG. 4.
FIG. 5.
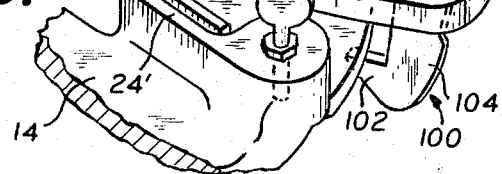
INVENTOR
HOWARD E. LINDBERG
BY
ATTORNEYS.

United States Patent Office

3,329,120
Patented July 4, 1967

3,329,120
CHAIN PIPE COVER
Howard E. Lindberg, 64 Nevada Ave.,
Staten Island, N.Y. 10306
Filed Feb. 28, 1966, Ser. No. 530,540
11 Claims. (Cl. 114—180)

This invention relates to covers for preventing the flooding of the chain lockers of ships. More particularly it relates to covers for the chain pipe or spurling pipe as it is sometimes called.

It is an object of the invention to provide an improved cover for the chain pipe, and to provide a cover with means for locking it in place as compared with the cover of Krogstad et al. Patent 2,555,696 in which the cover is held on the chain pipe merely by the weight of the chain.

Another object of this invention is to provide a chain pipe cover that can be located in assembled relation with the chain pipe more quickly and with less skill than has been required for covers of the prior art. By providing the cover of this invention with its own means for securing it to the chain pipe, it is unnecessary to adjust the position of the anchor chain accurately and it is sufficient for the cover to grip a fore-and-aft link even though there may be variations from one time to another in the exact level of the link.

The invention provides a cover with hooks that engage under a flange at the top of the chain pipe and the hooks are of special constructions so that they can be engaged and disengaged quickly and so that they will hold the cover against displacement from the chain pipe even when the hooks are not tightly clamped.

Another object is to provide a chain pipe cover of the character indicated, with various safety features for preventing accidental displacement from the chain pipe even when used by crew members who are careless or not competent.

Other objects, features and advantages of the invention will appear or be pointed out as the description proceeds.

In the drawing, forming a part hereof, in which like reference characters indicate corresponding parts in all the views;

FIGURE 3 is a sectional view taken on the line 3—3 of FIGURE 1 with a chain indicated in dotted lines in the position which the chain occupies in FIGURE 2;

FIGURE 4 is an enlarged, fragmentary detailed view of one of the hooks and the clamping means for securing the cover of FIGURES 1–3 to a chain pipe; and FIGURE 5 is an isometric view showing the hook and clamping means of FIGURE 4 and a portion of the cover which is adjacent to the particular clamping means illustrated in FIGURE 5.

Figure 1:
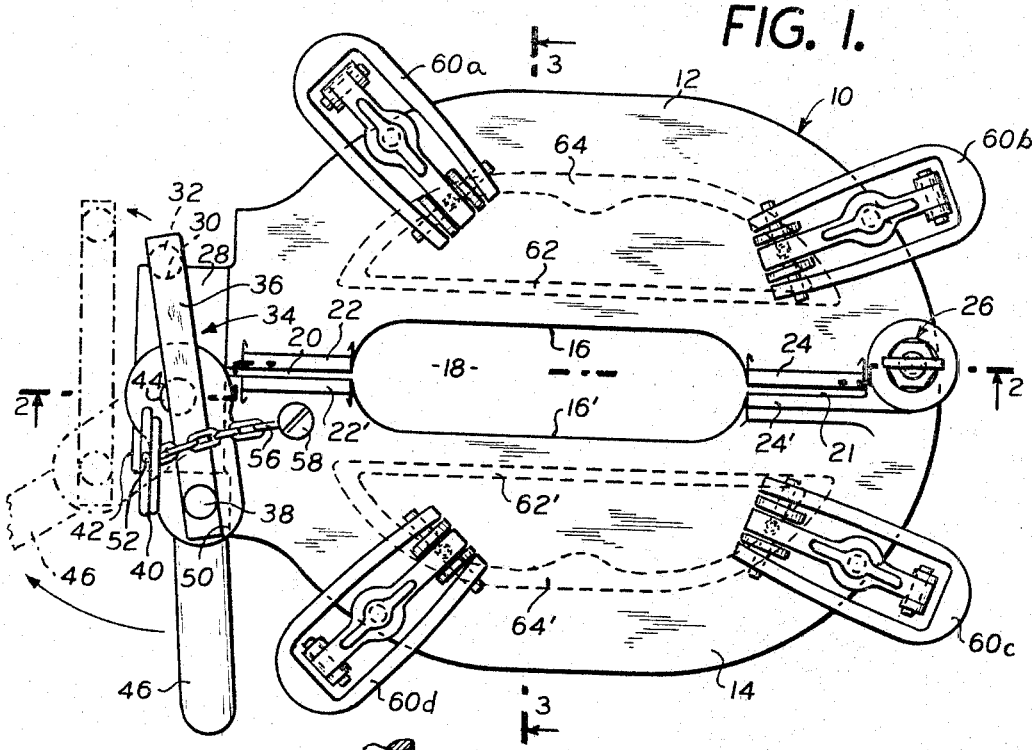
FIGURE 1 is a top plan view of a chain pipe cover made in accordance with this invention.

FIGURE 1 shows a cover 10 made in two halves 12 and 14. The half 12 has a recess 16 in its face which confronts a corresponding face in the other half 14; and the half 14 has a recess 16' in register with the recess 16 and forming with the recess 16 a slot 18 for receiving a link of an anchor chain. In the preferred construction, the slot 18 extends forward and aft and the cover is applied to the chain pipe when the chain is in a position which has one of its links extending forward and aft at the level of the upper end of the chain pipe.

The two halves 12 and 14 come together beyond the slot 18 along lines 20 and 21. At the line 20 there are edge ribs 22 and 22' on the halves 12 and 14, respectively for reinforcing the edges of these halves. Along the line 21 there are corresponding edge ribs 24 and 24' extending upwardly from the halves 12 and 14, respectively.

The two halves of the cover 10 are connected together by a hinge 26 which has a vertical axis and the construction of which will be explained in connection with FIGURE 2. At the other end of the cover 10 the half 12 has a lug 28 with a recess 30 for receiving a pin 32 of a toggle link clamp 34.

A toggle link clamp includes one long link 36, which is preferably a bail of which the pin 32 forms the closed end. This link 36 is connected by a pivot 38 to another link 40 which is connected to an extension 42 of the cover half 14 by a pivotal connection 44.

A handle 46 is rigidly secured to the link 40 and is preferably of one piece construction with the link 40. This handle 46 moves the link 40 angularly about the pivot connection 44. The link 40 is a bifurcated link which straddles the extension 42 but the handle 46 abuts against the cover half 14 at the location 50 to limit counterclockwise movement of the link 40 about the pivot connection 44.

In FIGURE 1, the toggle link clamp 34 is shown in its clamped position with the link 40 rotated as far as possible in a counterclockwise direction and a line connecting the axis of the pin 32 with the axis of the pivot connection 38 is beyond the center of the pivot 44 so that the clamp 34 remains tightly closed. If the handle 46 is moved in a clockwise direction, it shifts the link 36 to the other side of the center of the pivot connection 44 and moves the link 34 so that it is free to swing clear of the lug or extension 28 of the cover half 12 as shown in dotted lines in FIGURE 1. This releases the toggle link clamp 34 and permits the two halves of the cover to swing open as is necessary in order to place them around a link of an anchor chain.

In order to prevent the handle 46 from releasing the toggle link clamp 34 accidently, there is a pin 52 which extends into an opening in the extension 42 and which fits snugly in the opening. A handle portion 54 of the pin 52 extends up in front of the link 40 and prevents the link from moving counterclockwise when the pin 52 is in place. A chain 56 is connected at one end to the handle 54 and is secured at its other end to the cover 10 by a screw 58 so that when the pin 52 is removed from the opening in the extension 42 it cannot be misplaced or lost. The chain 56 holds the pin 42 in a position close to the cover 10 so that it is ready for repeated use whenever needed.

The cover 10 has four clamping means 60a, 60b, 60c and 60d located at spaced points around the perimeter of the cover. These clamping means will be described in connection with the other figures.

On the underside of the cover 10 there are two longitudinally extending ribs 62 and 62' which are preferably integral parts of the cover halves 12 and 14, respectively. The are also other ribs 64 and 64' extending downwardly from the underside of the cover and preferably of one piece construction with the ribs 62 and 62' and with the cover halves 12 and 14, respectively.

The ribs 62 and 62' are spaced back some distance beyond the sides of the slot 18 and the ribs 64 and 64' are spaced back some distance inward from the perimeter of the cover along most of the length of the sides of the cover. These ribs provide additional strength for the cover and make it stiff enough to support the weight of the anchor chain when the anchor chain is positioned with one of the transverse links resting on top of the cover. In the preferred construction, the ribs 62, 62', 64 and 64' also provide a backing for gasket material which will be described in connection with the other figures.

Figure 2:
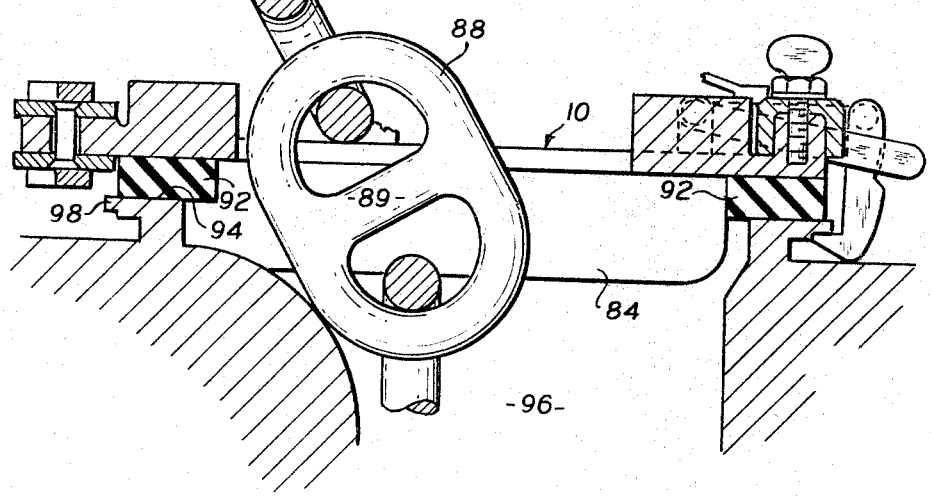
FIGURE 2 is a sectional view taken along the section line 2—2 of FIGURE 1 and showing the cover located on a chain pipe and with a chain in position in the cover.

FIGURE 2 shows the construction of the hinge 26. A stud 68 which is preferably a one piece construction with the cover half 14 extends upwardly into a socket 70 formed in a portion 72 of the cover half 12. This provides a hinge connection between the cover halves; but to insure that the hinge connection cannot become accidentally separated, there is a screw 74 which passes through an opening in the portion 72 of the hinge and threads into the stud 68. This screw 74 preferably has a knob or handle portion 76 at its upper end and has a washer 78 for increasing the area of restraint for preventing the hinge parts from moving apart axially.

Referring to FIGURES 2 and 3, there are sections of sealing material 84 and 84' secured to the bottom of the cover halves 12 and 14, respectively. These sections of sealing material 84 and 84' extend across the opening or slot 18, each of the sections 84 and 84' being wide enough to extend across that portion of the slot 18 which is formed in the cover half to which the particular section is connected. It will be evident from FIGURE 3 that the longitudinally extending ribs 62 and 62' provide good areas for connecting the sections of sealing material 84 and 84' to the cover by adhesive since the upper portions of the sealing material sections are not in contact with the bottom of the cover for most of their undistorted widths.

The sections of sealing material 84 and 84' are preferably made of rubber which is soft enough to be displaced by a chain link 88, and resilient enough to extend around the material of the chain link so that the sealing material hugs the chain link and provides a good shield for preventing leakage of water into the chain pipe through the slot 18 and around the chain link 88. It is preferable to have the sealing material sections 84 and 84' wide enough in a lateral direction so that when the two halves of the cover are brought together, the sections of sealing material will touch one before the halves are in their fully closed position and thus put the sealing material sections 84 and 84' under some pressure to provide good sealing at portions of the slot 18 where there is no chain link.

The sections of sealing material 84 and 84' are preferably deep enough so that they cover a mid-section 89 of a chain link 88 when the chain link is one constructed with mid-sections. This facilitates a water-tight seal for the portion of the slot that lies within the open interior of the chain link. Neoprene has not proved as satisfactory as rubber for the sealing material because it is difficult to get neoprene of a consistency which will close around the link in the manner in which rubber does to provide a water-tight seal; but any plastic material which has the pehysical characteristics necessary to hug the chain link in the manner herein described can be used for sealing the slot 18.

There is other sealing material comprising a gasket 92 on the underside of the cover 10 and extending around the entire perimeter of the cover at a location where the gasket 92 contacts with an end face 94 of a chain pipe 96. In the construction illustrated in FIGURE 2, the chain pipe 96 has flange 98 around its upper end, and the cover 10 is clamped against this flange 98 so as to put the gasket 92 under some compression and thereby obtain a more effective seal against the leakage of water into the pipe 96 between the cover 10 and the end face 94 of the pipe. The gasket 92 preferably extends in as far as the ribs 64 and 64' along those portions of the cover where there are ribs 64 and 64'. The gasket 92 is preferably secured to the bottom of the cover and the ribs 64 by adhesive.

FIGURE 4 shows the construction of the clamping means 60b. This calmping means includes a hook 100 having a free end 102 which engages under the flange 98 when the cover is used on a chain pipe having such a flange. The hook 100 has a portion 104 which extends upwardly and part of which has a curve 106 with a radius of cruvature equal to the effective length of a releasable lock 108.

The upper end of the hook 100 swings on a pivot 110 located above the level of the bottom of the cover half 12 so that the hook can swing outwardly and away from the sides of the cover, if desired. The pivot 110 can be raised and lowered by bracket means which include a bearing element 112 and an arm 114. The pivot 110 is carried by the right-hand end of the arm 114. The other end of the arm 114 is connected with the bearing element 112 by a pivot connection 116. The bearing element 112 is at a fixed location on the cover half 12 and in the construction shown is rigidly attached to the cover by a screw 118 which extends through the cover and which threads into the bearing element 112.

The arm 114 has a mid-section 120 which is of increased width and there is a screw 122 which threads through this mid-section 120 and which abuts against the top surface of the cover half 12. The screw 122 has a handle portion 124 at its upper end so that it can be turned without a tool and rotation of the screw 122 causes the arm 114 to move up or down about the pivot connection 116 depending upon the direction in which the screw 122 is turned.

The lock 108 is preferably a bail with a surface 130 at its closed end in position to contact with the surface 106 of the hook 100. The other end of this releasable lock 108 is carried by the same pivot connection 116 as supports the arm 114. Thus the arm 114 and the lock 108 rotate about the same center. And the effective length of the releasable lock is the distance from the axis of the pivot connection 116 to the surface 130. This distance is the radius of curvature of the surface 106 in the preferred construction of the invention.

With the lock 108 in the position shown in FIGURE 4 or slightly lower, and it can move lower before it strikes the top of the cover half 12, and with the arm 114 down at the same level, the hook 100 will hang down straight with the free end of the hook out beyond the outer periphery of the chain pipe flange 98. As the screw 122 is turned to move the arm 114 counterclockwise about its pivot connection 116, the pivot 110 rises and as the hook 100 moves upward, the lock 108, remaining in its lowermost position, pulls the hook 100 further and further in until the hook is well under the flange 98 before it comes in contact with the bottom of the flange.

After the free end 102 of the hook 100 has engaged the bottom of the flange 98, continued rotation of the screw 122 in a direction to move the pivot 110 upward causes the cover to be clamped down more tightly on the flange 98 with resulting compression of the gasket 92. If at any time it is necessary to remove the cover quickly, such as a case where the anchor has to be dropped on short notice, the clamping means 60b can be released without operating the screw 122 by merely pulling the releasable lock 108 upward and this can be done because of the fact that the surface 106 has a radius of curvature equal to the effective length of the lock 108. Thus all of the clamps can be released substantially instantly and the cover can be opened up by also releasing the toggle link clamp as described in connection with FIGURE 1.

Theoretically the cover can be applied in a reverse manner by pushing down on the releasable lock 108 but it is difficult to clamp it tightly in this way and usually it is satisfactory to clamp it to the chain pipe by using the screw 122 as has already been described.

Even with chain pipes which have no flanges at their upper ends, the hooks 100 are effective to prevent lateral displacement of the covers because with the lock 108 in its operative position, as shown in FIGURE 4, lateral displacement against the hook 100 does not tend to swing the hook around its pivot 110 because the surface 106, because of the curvature already described, cannot act as a cam to lift the lock 108.

The preferred embodiment of the invention has been illustrated and described, but changes and modifications can be made and some features can be used in different combinations without departing from the invention as defined in the claims.

What is claimed is:

1. A chain pipe cover including two halves that fit against opposite sides of an anchor chain which extends downward into a chain pipe, said halves together forming a cover which projects beyond the outside edges of the entrance opening of the chain pipe, detachable means connecting the halves of the cover together, a plurality of hooks at spaced locations around the perimeter of the cover, each of the hooks having a free end that extends inward under the edge portion of the cover, and having another portion that extends upward beyond the perimeter of the cover, bracket means connected to the cover, a pivot at the upper part of each hook, above the bottom of the cover, and connecting the hook with said bracket means, the pivot being in position for the hook to swing between one position where it projects under the cover to another position outward from the cover, and a releasable lock for holding the hook in the position in which it extends under the cover.

2. The chain pipe cover described in claim 1 characterized by the bracket means having structure for adjusting the pivot up and down, and the free end of the hook being movable toward and from the bottom of the cover as said pivot is moved up and down.

3. The chain pipe cover described in claim 1 characterized by the bracket means including a bearing element secured to the cover, and an arm pivotally connected at one end to said bearing means and extending therefrom outwardly beyond the perimeter of the cover, and the pivot at the upper part of the hook being carried by the end portion of the arm that extends beyond the perimeter of the cover, and the lock being an angularly movable element pivotally connected to said bearing element with an axis generally parallel to the axis of the pivot for the hook and having a portion that extends behind the hook below the pivot of the hook to hold the hook against swinging movement away from the perimeter of the cover.

4. The chain pipe cover described in claim 3 characterized by the lock being a bail that has its open end connected with the bearing element by the same pivotal connection that connects the arm to the bearing element, the hook having an outer surface that confronts a surface of the bail and that is below the pivot of the hook when the hook is hanging downward, said outer surface being curved about an axis of curvature parallel to the axis of the connection of the bail to the bearing element and with the radius of curvature substantially equal to the distance of the confronting face of the bail from the pivot axis of the bail.

5. The chain pipe cover described in claim 3 characterized by the structure of adjusting the pivot of the hook up and down being a screw that threads through a portion of the arm at an intermediate location along the arm and that has a lower end which abuts against the top surface of the cover to thrust the arm upward and swing it about its pivot connection with the bearing element in a direction to swing the arm away from the cover.

6. The chain pipe cover described in claim 2 characterized by there being a plurality of hooks at spaced locations around the perimeter of the cover, each hook extending inward under the cover and at a distance below the cover when the hook is down so as to engage a flange around the end of a chain pipe on which the cover is intended to be used, each hook having an abutment surface for engaging a vertical surface of the chain pipe to stop lateral displacement of the cover on the chain pipe even though the hook is not clamped into gripping relationship with the flange, or the cover is on a chain pipe that has no flange.

7. The chain pipe cover described in claim 1 characterized by the detachable means connecting the halves of the cover together including stud-and-socket elements on the respective halves engageable to make a hinge connection between the halves, and a detachable fastening element for preventing disengagement of the stud and socket.

8. The chain pipe cover described in claim 1 characterized by the detachable means connecting the halves of the cover together including a hook end on one half and a toggle strap on the other half with an operating handle for the strap, and an interference pin that fits into an opening in the cover in a position to prevent movement of the operating handle into a strap-releasing position.

9. The chain pipe cover described in claim 1 characterized by each of the halves having a recess in an edge thereof that confronts the corresponding edge of the other half to form a slot between the halves for receiving a fore-and-aft link of the chain, sealing material attached to the cover below the slot and extending across the slot, the sealing material being soft and resilient for fitting into and around the structure of the link to seal the slot around the link.

10. The chain pipe cover described in claim 9 characterized by longitudinally extending ribs of the cover on the underside thereof and spaced back from the slot, there being sealing material on both sides of the slot extending back to said longitudinal ribs.

11. The chain pipe cover described in claim 10 characterized by other ribs back from the perimeter of the cover and extending around most of the cover, and other sealing material on the underside of the cover around the entire perimeter portion of the cover for contact with the end of a chain pipe, the sealing material around the perimeter portion extending inwardly to other ribs along most of the length of said other sealing material.

No references cited.

MILTON BUCHLER, *Primary Examiner.*

A. H. FARRELL, *Assistant Examiner.*